(12) United States Patent
Oyama

(10) Patent No.: US 11,204,608 B2
(45) Date of Patent: Dec. 21, 2021

(54) VEHICLE TRAVELING CONTROL APPARATUS

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 156 days.

(21) Appl. No.: 16/744,965

(22) Filed: Jan. 16, 2020

(65) Prior Publication Data

US 2020/0310452 A1 Oct. 1, 2020

(30) Foreign Application Priority Data

Mar. 28, 2019 (JP) .............................. JP2019-064498

(51) Int. Cl.
*B60W 30/16* (2020.01)
*G05D 1/02* (2020.01)

(52) U.S. Cl.
CPC ......... *G05D 1/0223* (2013.01); *B60W 30/162* (2013.01); *G05D 1/0293* (2013.01)

(58) Field of Classification Search
CPC . G05D 1/0223; G05D 1/0293; B60W 30/162; B60W 2556/50; B60W 2552/30; B60W 2554/804; B60W 2554/802; B60W 30/143; B60W 30/16; B60W 40/072; B60W 2420/42; B60W 2552/53
See application file for complete search history.

(56) References Cited

FOREIGN PATENT DOCUMENTS

JP 2001-216599 A 8/2001

*Primary Examiner* — Peter D Nolan
*Assistant Examiner* — Ashley L Redhead, Jr.
(74) *Attorney, Agent, or Firm* — McDermott Will & Emery LLP

(57) ABSTRACT

A vehicle traveling control apparatus includes a first traveling environment recognition unit using an onboard sensor, a second traveling environment recognition unit using external information, a visibility distance calculating unit, a first deceleration control unit, a second deceleration control unit, and a start timing changing unit. When a sum of an estimation error of a distance set in the second traveling environment recognition unit and a visibility distance is larger than a distance to a rearmost vehicle under congestion recognized by the second traveling environment recognition unit, the start timing changing unit calculates a deceleration required distance necessary until deceleration control is taken over from second deceleration control by the second deceleration control unit, to first deceleration control by the first deceleration control unit, and start the second deceleration control from a distance longer than a second control target distance at a timing considering the deceleration required distance.

3 Claims, 12 Drawing Sheets

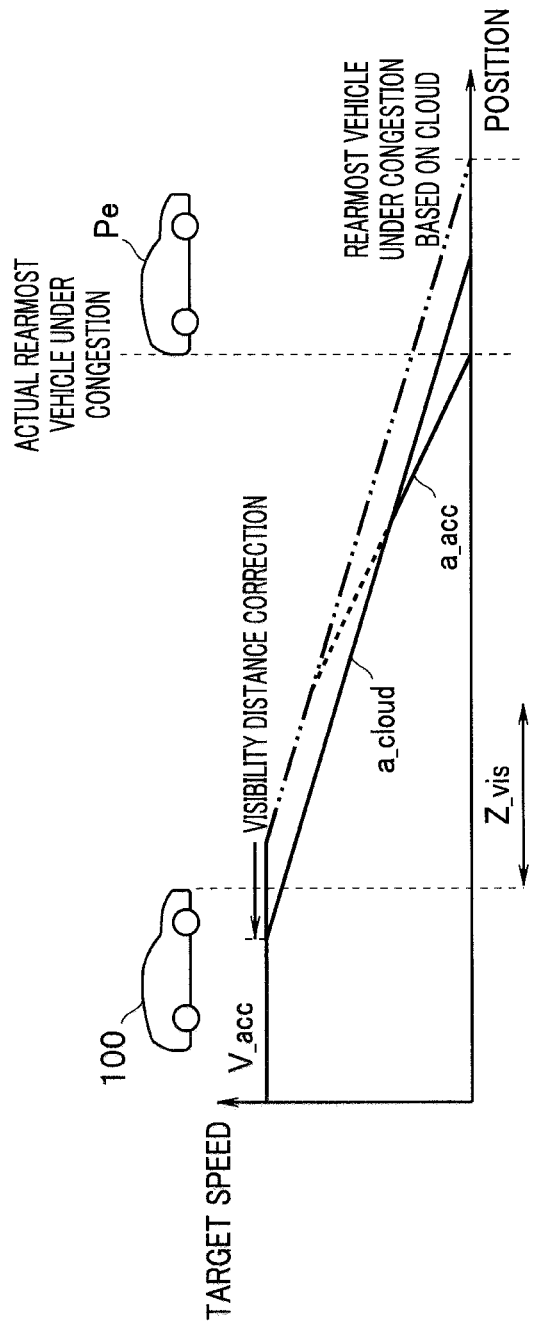

VEHICLE TRAVELING CONTROL APPARATUS

CROSS-REFERENCE TO RELATED APPLICATIONS

The present application claims priority from Japanese Patent Application No. 2019-064498 filed on Mar. 28, 2019, the entire contents of which are hereby incorporated by reference.

BACKGROUND

The technology relates to a vehicle traveling control apparatus that performs deceleration control for avoiding a collision with a forward obstacle such as a preceding vehicle.

Various driving assistance techniques for reducing a driver's burden and enabling a driver to perform comfortable and safe driving have been proposed for recent vehicles, and some of them have already been put into practical use.

This type of driving assistance has an adaptive cruise control (ACC) function and a lane keeping control function to enable a vehicle to automatically travel along a traveling lane while maintaining an inter-vehicle distance from a preceding vehicle. Furthermore, by providing a locator function, an own vehicle is enabled to automatically travel to a destination.

In the ACC control, the distance between an own vehicle and a preceding vehicle is recognized, for example, by a forward recognition apparatus including an in-vehicle camera or various types of radar sensors mounted on the own vehicle, or a combination thereof, and the own vehicle is caused to travel while following the preceding vehicle. Furthermore, in the ACC control, when the preceding vehicle stops, all-speed following control is performed, which stops the own vehicle while keeping a predetermined inter-vehicle distance from the preceding vehicle and starts the own vehicle in response to the start of the preceding vehicle.

When the own vehicle automatically stops by following the preceding vehicle, deceleration control is performed based on the relative vehicle speed between the preceding vehicle and the own vehicle and the inter-vehicle distance so that the own vehicle stops, with a predetermined inter-vehicle distance kept from the preceding vehicle. For example, even in a state where congestion that suddenly stagnates flow of vehicles, such as accident congestion or construction congestion, occurs ahead of the own vehicle in traveling on an expressway, if a rearmost vehicle in a vehicle queue under congestion is recognized from a long distance by the forward recognition apparatus, the deceleration control enables the own vehicle to stop or follow at a low speed with respect to the rearmost vehicle, with the predetermined inter-vehicle distance kept from the rearmost vehicle without decelerating the own vehicle rapidly.

However, for example, when a curved road or the like is present ahead of the own vehicle in traveling on an expressway, it is impossible to recognize the rearmost vehicle of the vehicle queue under the congestion from a long distance by the forward recognition apparatus, and when the rearmost vehicle of the vehicle queue under the congestion is recognized at a relatively short range, the deceleration control causes the own vehicle to decelerate rapidly, to ensure the inter-vehicle distance.

As a technique for decelerating an own vehicle in advance to avoid rapid deceleration even when a rearmost vehicle in a vehicle queue under congestion cannot be recognized from a long distance, for example, Japanese Unexamined Patent Application Publication (JP-A) No. 2001-216599 discloses a technique of calculating a distance from an own vehicle to a rearmost vehicle in a vehicle queue under congestion, based on a current position of the own vehicle acquired based on a positioning signal from a positioning satellite or the like, and on position information of the rearmost vehicle (preceding vehicle) in the vehicle queue under the congestion contained in congestion information in a traveling direction of the own vehicle which is acquired from a road traffic information distribution service, and issuing a warning for promoting a driver to decelerate the own vehicle when the calculated distance is within a certain distance.

Furthermore, JP-A No. 2001-216599 also discloses a technique in which when the distance to the rearmost vehicle is within the certain distance and a vehicle speed is equal to a certain value or more, in addition to the issuance of the warning described above, the own vehicle is forcibly decelerated by one or both of downshift control of a gear ratio and control of a braking operation so that the inter-vehicle distance becomes a certain value or more.

SUMMARY

An aspect of the technology provides a vehicle traveling control apparatus. The apparatus includes a first traveling environment recognition unit, a second traveling environment recognition unit, a visibility distance calculating unit, a first deceleration control unit, and a second deceleration control unit. The first traveling environment recognition unit that recognizes, with an autonomous sensor mounted in an own vehicle, a traveling environment in front of an own vehicle traveling path in which the own vehicle travels. When the rearmost vehicle under the congestion is recognized only by the second traveling environment recognition unit, the second traveling environment recognition unit recognizes a traveling environment in front of the own vehicle traveling path based on information received from an outside of the own vehicle by external communication. The visibility distance calculating unit calculates a visibility distance by the autonomous sensor based on the traveling environment recognized by the first traveling environment recognition unit. When the rearmost vehicle under the congestion is recognized by the first traveling environment recognition unit, the first deceleration control unit calculates a first control target distance for causing the own vehicle to stop before a rearmost vehicle under congestion at a first deceleration, and performs first deceleration control based on the first control target distance. When the rearmost vehicle under the congestion is recognized only by the second traveling environment recognition unit, the second deceleration control unit calculates a second control target distance for causing the own vehicle to stop before the rearmost vehicle under the congestion at a second deceleration that is a deceleration smaller than the first deceleration, and performs second deceleration control based on the second control target distance. When a sum of an estimation error of a distance set in the second traveling environment recognition unit and the visibility distance is larger than a distance to the rearmost vehicle under the congestion recognized by the second traveling environment recognition unit, the start timing changing unit calculates a deceleration required distance necessary until deceleration control is taken over from the second deceleration control to the first deceleration control, and starts the second deceleration control from a distance longer than the second control target distance at a timing considering the deceleration required distance.

An aspect of the technology provides a vehicle traveling control apparatus including circuitry. The circuitry recognizes, with an autonomous sensor mounted in an own vehicle, a first traveling environment in front of an own vehicle traveling path in which the own vehicle travels. The circuitry recognizes a second traveling environment in front of the own vehicle traveling path based on information received from an outside of the own vehicle by external communication. The circuitry calculates a visibility distance by the autonomous sensor based on the first traveling environment. When a rearmost vehicle under congestion is recognized in the first traveling environment, the circuitry calculates a first control target distance for causing the own vehicle to stop before the rearmost vehicle under the congestion at a first deceleration, and performs first deceleration control based on the first control target distance. When the rearmost vehicle under the congestion is recognized only in the second traveling environment, the circuitry calculates a second control target distance for causing the own vehicle to stop before the rearmost vehicle under the congestion at a second deceleration which is a deceleration smaller than the first deceleration, and performs second deceleration control based on the second control target distance. When a sum of an estimation error of a distance preset for the second traveling environment and the visibility distance is larger than a distance to the rearmost vehicle under the congestion recognized in the second traveling environment, the circuitry calculates a deceleration required distance necessary until deceleration control is taken over from the second deceleration control to the first deceleration control, and start the second deceleration control from a distance longer than the second control target distance at a timing considering the deceleration required distance.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 6B is an explanatory diagram illustrating the deceleration control when the detection range by the autonomous sensor is insufficient;

DETAILED DESCRIPTION

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the technique disclosed in JP-A No. 2001-216599, it is assumed that the information on the actual position of a rearmost vehicle contains a predetermined error because information (cloud information) obtained from a road traffic information distribution service or the like is updated every predetermined time (for example, every 5 seconds).

Accordingly, when a vehicle is decelerated on a curve with poor visibility (so-called blind curve) or the like based only on the information of the road traffic information distribution service or the like, there may be a case that the vehicle excessively approaches a rearmost vehicle when the rearmost vehicle is recognized by a forward recognition apparatus, and thus the vehicle is forced to rapidly decelerate, for example.

Therefore, in view of the above circumstances, it is desirable to provide a vehicle traveling control apparatus capable of performing deceleration control with respect to a preceding vehicle without performing rapid deceleration even on a road with poor visibility, etc.

Figure 1:
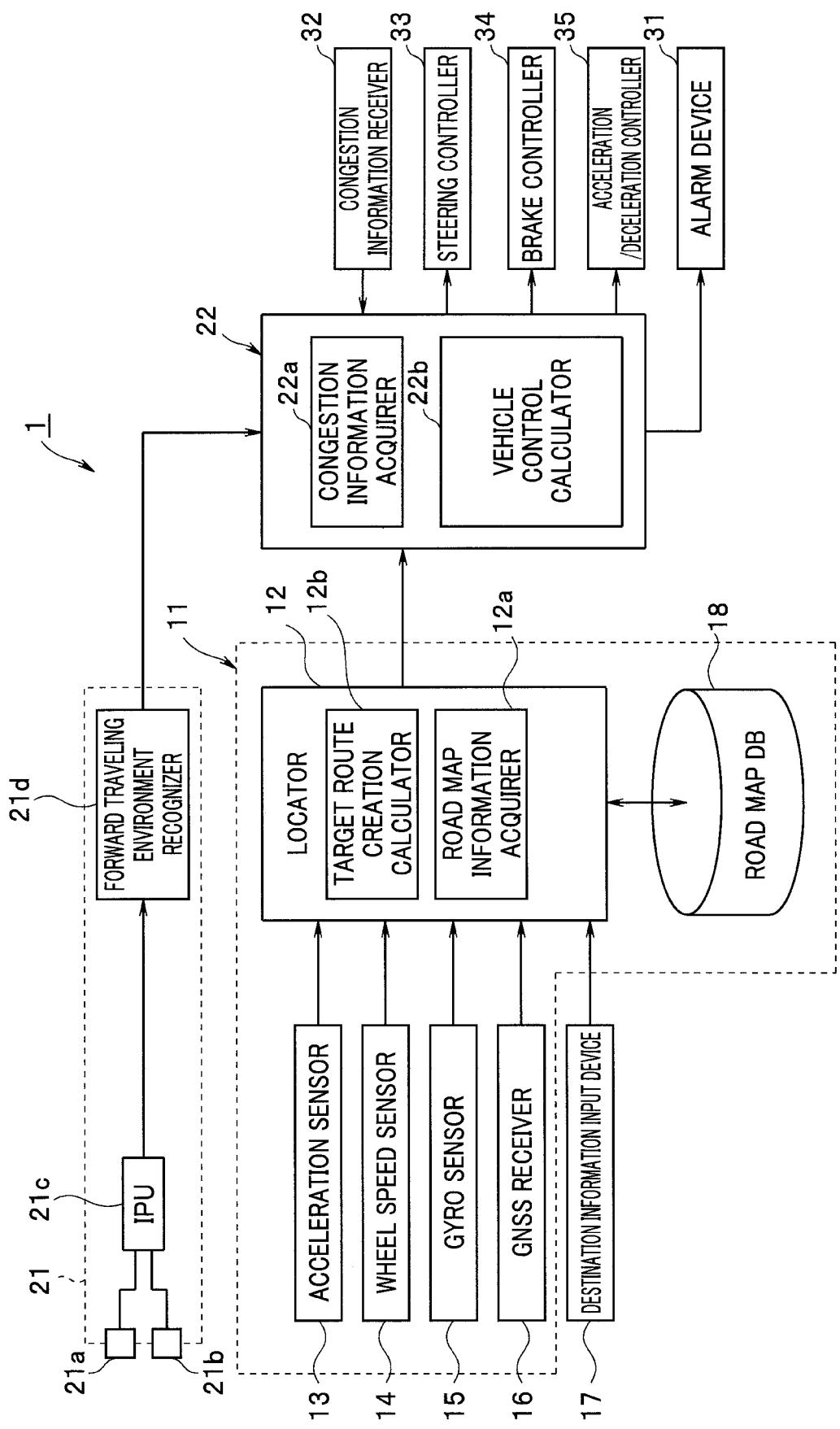
FIG. 1 is a schematic configuration diagram of an automatic driving system.

An embodiment of the technology will be described below with reference to the drawings. An automatic driving system 1 illustrated in FIG. 1 is mounted in an own vehicle 100 (see FIGS. 4 to 11). In one embodiment, the automatic driving system 1 may serve as a "vehicle traveling control apparatus". The automatic driving system 1 is equipped with a locator unit 11 as a unit for detecting the position of the own vehicle, and a camera unit 21 as a first traveling environment information acquirer.

The locator unit 11 estimates the position of the own vehicle 100 (own vehicle position) on a road map, and acquires road map data ahead of the own vehicle position. Furthermore, the camera unit 21 acquires traveling environment information ahead of the own vehicle 100 to recognize lane markings for marking the right and left of a traveling lane, a road shape, the presence or absence of a preceding vehicle, etc., and determine a road curvature at the center of the lane markings, an inter-vehicle distance and a relative speed with respect to the preceding vehicle, etc.

The locator unit 11 includes a locator calculator 12 and a high-precision road map database 18 as a memory. The locator calculator 12, a forward traveling environment recognizer 21d described later, and an automatic driving control unit 22 are configured by a well-known microcomputer including a CPU, RAM, ROM, and the like, and peripheral devices thereof. Programs to be executed in the CPU, fixed data such as a base map and the like are stored in advance in the ROM.

A sensor group for detecting parameters required for estimation of the current position of the own vehicle 100 (own vehicle position) is coupled to an input side of the locator calculator 12. The sensor group includes an acceleration sensor 13 for detecting forward and backward acceleration acting on the own vehicle 100, a wheel speed sensor 14 as a vehicle speed detector for detecting a vehicle speed from rotational speeds of the front, rear, right, and left wheels, a gyro sensor 15 for detecting an angular velocity or angular acceleration of the own vehicle 100, a global navigation satellite system (GNSS) receiver 16 for receiving positioning signals transmitted from a plurality of positioning satellites, etc. Furthermore, a destination information input device 17 for inputting destination information (address, telephone number, selection from a registered list displayed on a monitor, etc.) on a road map is coupled to the locator calculator 12.

The locator calculator 12 includes a road map information acquirer 12a and a target route creation calculator 12b. The road map information acquirer 12a acquires a position coordinate (latitude, longitude) of the own vehicle 100 based on the positioning signal received by the GNSS receiver 16, performs map-matching of the position coordinate of the own vehicle 100 and a position coordinate (latitude, longitude) of a destination input via a destination information input device 17 onto the road map stored in a high-precision road map database 18 to identify both of the positions, and transmits road map information from the current own vehicle position to the destination to a target route creation calculator 12b.

Under an environment in which an effective positioning signal cannot be received from a positioning satellite due to deterioration in sensitivity of the GNSS receiver 16 as in a case of in-tunnel traveling or the like, the road map information acquirer 12a switches to an autonomous navigation for estimating an own vehicle position based on a vehicle speed determined based on a wheel speed detected by the wheel speed sensor 14, an angular velocity detected by the gyro sensor 15, and forward and backward acceleration detected by the acceleration sensor 13, and estimates the own vehicle position on a road map.

Here, the above-described high-precision road map database 18 is a large-capacity storage medium such as an HDD, and stores high-precision road map information (dynamic map) therein. The high-precision road map information contains lane data (lane width data, lane center position coordinate data, lane traveling azimuth angle data, speed limit, etc.) required to perform automatic driving, and the lane data are stored at intervals of several meters for each lane on the road map.

The target route creation calculator 12b creates, on the road map, a target route connecting a current position and a destination which have been subjected to map-matching by the road map information acquirer 12a, and sets, on the target route ahead of the own vehicle 100, a target traveling path for causing the own vehicle 100 to automatically travel along a traveling lane (in a case of three lanes, the center of the right and left lane markers of any of a left lane, a center lane, and a right lane). The target traveling path information is read by an automatic driving control unit 22.

The camera unit 21 is fixed to an upper center of a front portion of the vehicle interior of the own vehicle 100, and includes an in-vehicle camera (stereo camera) having a main camera 21a and a sub camera 21b which are disposed at symmetrical positions with respect to the center in a vehicle width direction, an image processing unit (IPU) 21c, and a forward traveling environment recognizer 21d. The camera unit 21 performs, in the IPU 21c, predetermined image processing on traveling environment image information ahead of the own vehicle 100 captured by both the cameras 21a and 21b. In one embodiment, the in-vehicle camera may serve as an "autonomous sensor".

The forward traveling environment recognizer 21d reads the traveling environment image information which has been subjected to image processing in the IPU 21c, and recognizes a forward traveling environment based on the traveling environment image information. The forward traveling environment to be recognized includes a road shape (the road curvature 1/m at the center of the lane markers for marking the right and left, and the width between the right and left markers (lane width)) of the traveling path on which the own vehicle 100 travels (the own vehicle traveling path), and preceding vehicles traveling on the own vehicle traveling path and adjacent lanes. Further, when a preceding vehicle is detected, the forward traveling environment also includes an inter-vehicle distance between the own vehicle and the preceding vehicle, and a relative vehicle speed obtained based on change of the inter-vehicle distance. The forward traveling environment information is transmitted to the automatic driving control unit 22.

The automatic driving control unit 22 includes a congestion information acquirer 22a and a vehicle control calculator 22b. In addition to the locator calculator 12 and the forward traveling environment recognizer 21d, a congestion information receiver 32 as the congestion information acquirer is coupled to the input side of the automatic driving control unit 22. The congestion information receiver 32 receives road traffic information as traveling environment information which is cloud information distributed from a road traffic information distribution center exemplified by a vehicle information and communication system (VICS: registered trademark) center. One of the road traffic information is congestion information. The congestion information is updated and distributed every predetermined time (for example, 5 sec). In one embodiment, the congestion information acquirer 22a may serve as a "second traveling environment recognizer" together with the congestion information receiver 32.

Further, an alarm device 31 as an alarm, a steering controller 33 for causing the own vehicle 100 to travel along a lane, a brake controller 34 for decelerating the own vehicle 100 by forced braking, and an acceleration/deceleration controller 35 for controlling the vehicle speed of the own vehicle 100 are coupled to an output side of the automatic driving control unit 22.

The congestion information acquirer 22a of the automatic driving control unit 22 acquires congestion information received by the congestion information receiver 32. Here, congestion is generally defined as having a traveling speed of 20 to 40 Km/h or less and a vehicle queue of 1 Km or more. Accordingly, a vehicle queue under congestion after a predetermined time has elapsed moves in a traveling direction except for a case where stoppage of vehicles under the congestion continues. The congestion information includes a distance (length) and a moving speed of the vehicle queue under the congestion, position coordinates of a leading vehicle and a rearmost vehicle Pe, and the like. The congestion information is read by the vehicle control calculator 22*b*.

The vehicle control calculator 22*b* includes an adaptive cruise control (ACC) function. Accordingly, when the camera unit 21 does not capture any preceding vehicle on the target traveling path, the vehicle control calculator 22*b* causes the own vehicle 100 to travel at a set vehicle speed, and when the camera unit 21 captures a preceding vehicle, the vehicle control calculator 22*b* causes the own vehicle 100 to travel and follow the preceding vehicle, with a predetermined inter-vehicle distance maintained from the preceding vehicle. The ACC is also applied to pre-congestion deceleration control that is executed when the own vehicle 100 approaches the rearmost vehicle Pe in the vehicle queue under the congestion.

In the pre-congestion deceleration control, when the rearmost vehicle Pe is detected (captured) based on traveling environment information acquired by the camera unit 21 which is an autonomous sensor, the vehicle control calculator 22*b* basically calculates a following stop distance Z_acc as a first control target distance necessary to stop the own vehicle 100 before the rearmost vehicle Pe by using a deceleration preset as a first deceleration (a basic deceleration a_acc preset in the ACC control), and performs first deceleration control (following deceleration control) using the basic deceleration a_acc when a sensor inter-vehicle distance Z_sensor to the rearmost vehicle Pe falls below the following stop distance Z_acc.

Figure 3:
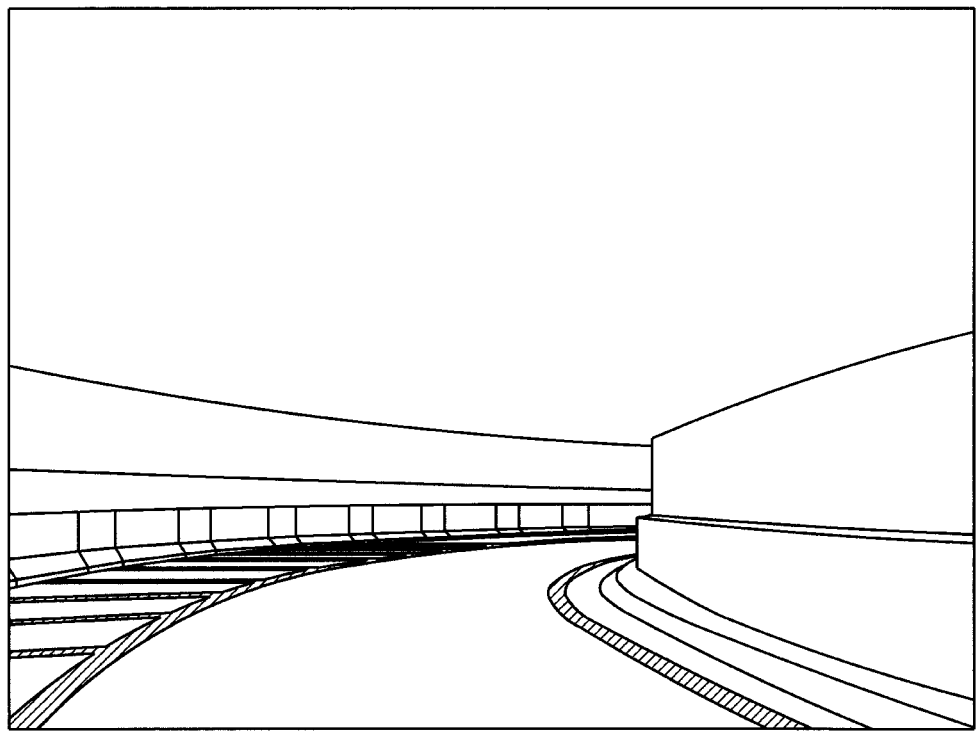
FIG. 3 is an explanatory diagram illustrating a specific example of a curve with poor visibility.
Figure 4:
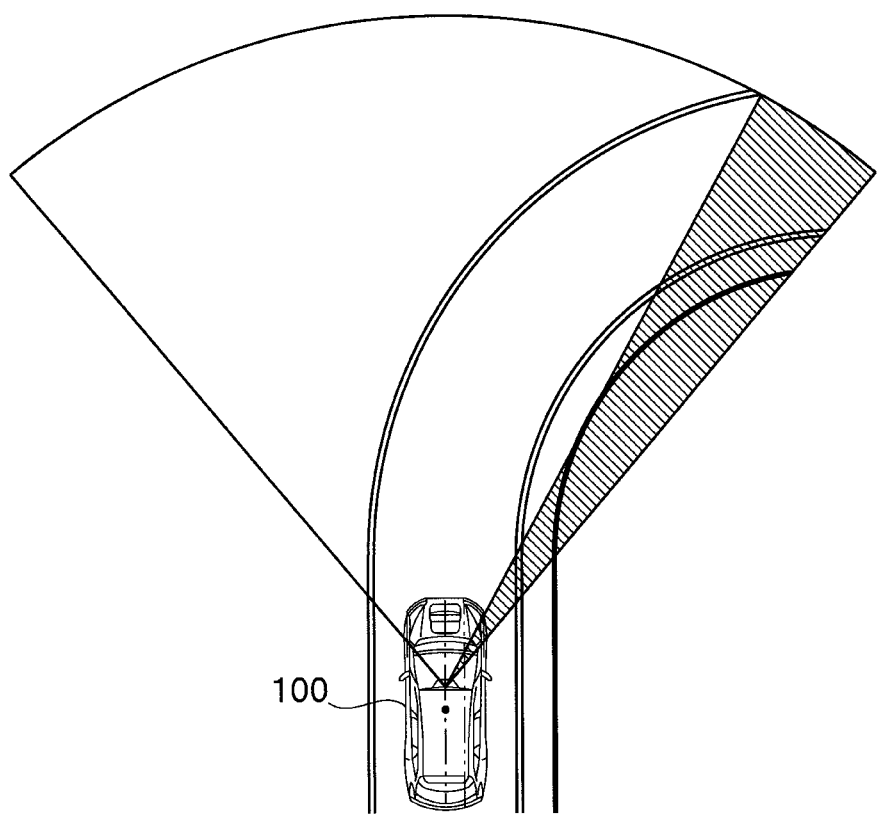
FIG. 4 is an explanatory diagram illustrating an area where recognition by an autonomous sensor is difficult on a curve with poor visibility.
Figure 5:
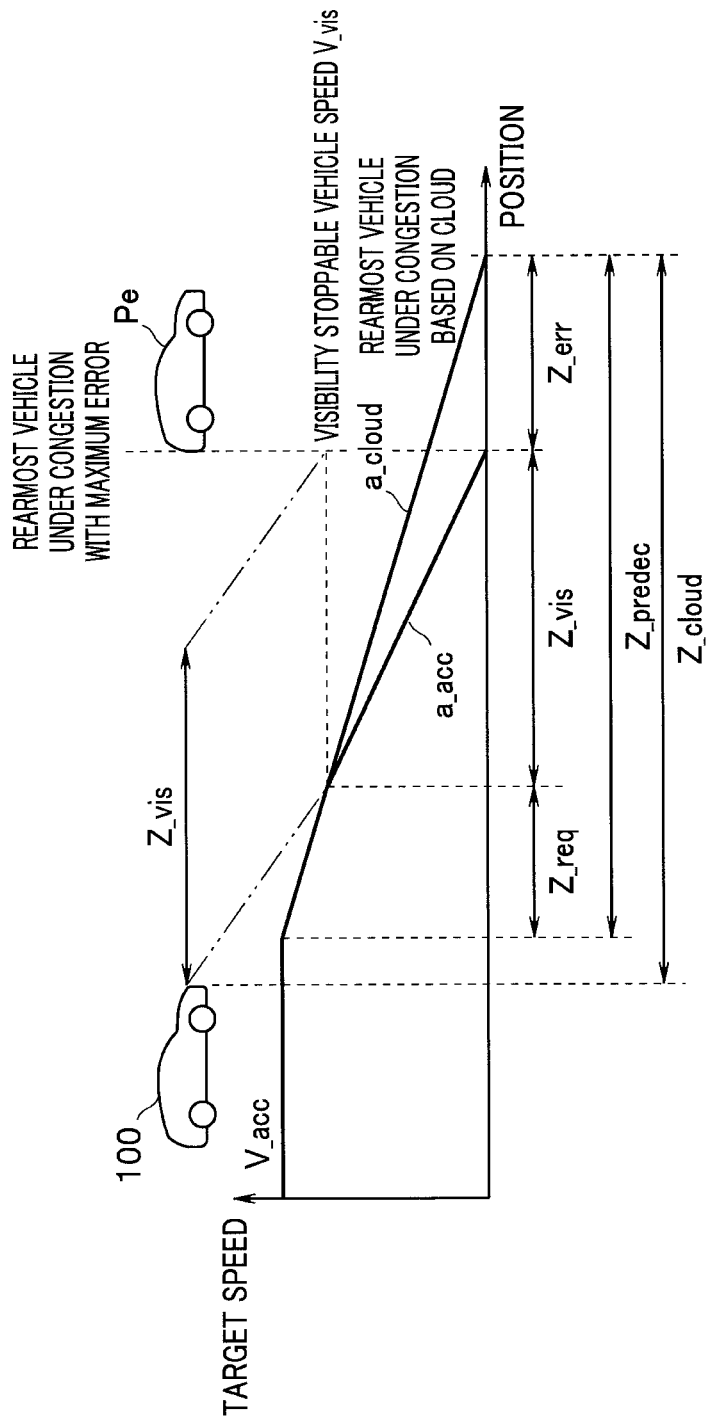
FIG. 5 is an explanatory diagram illustrating respective parameters during deceleration control.
Figure 7:
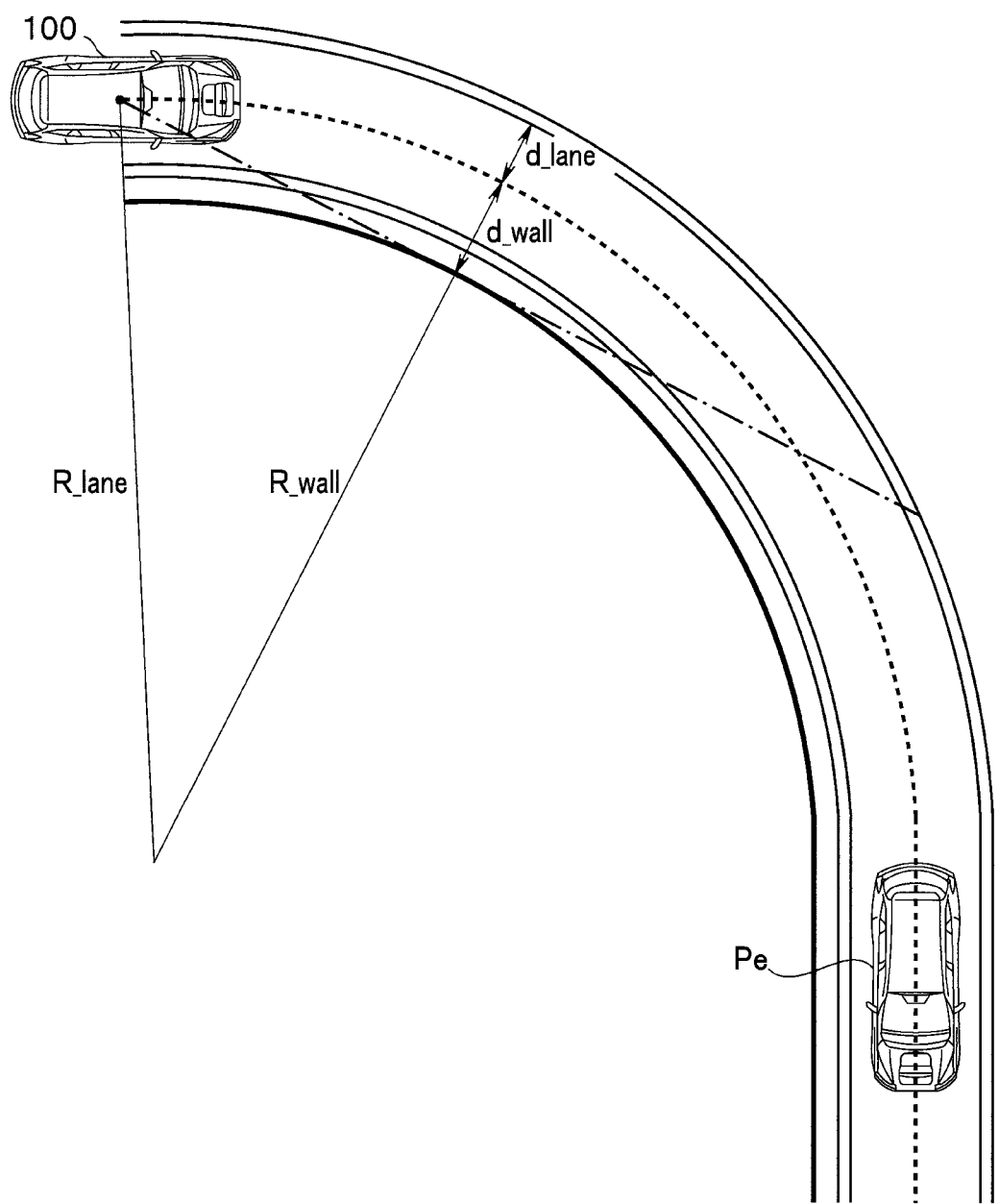
FIG. 7 is an explanatory diagram illustrating a visibility distance by the autonomous sensor when a field of view is blocked by a road side wall during curve traveling.
Figure 8:
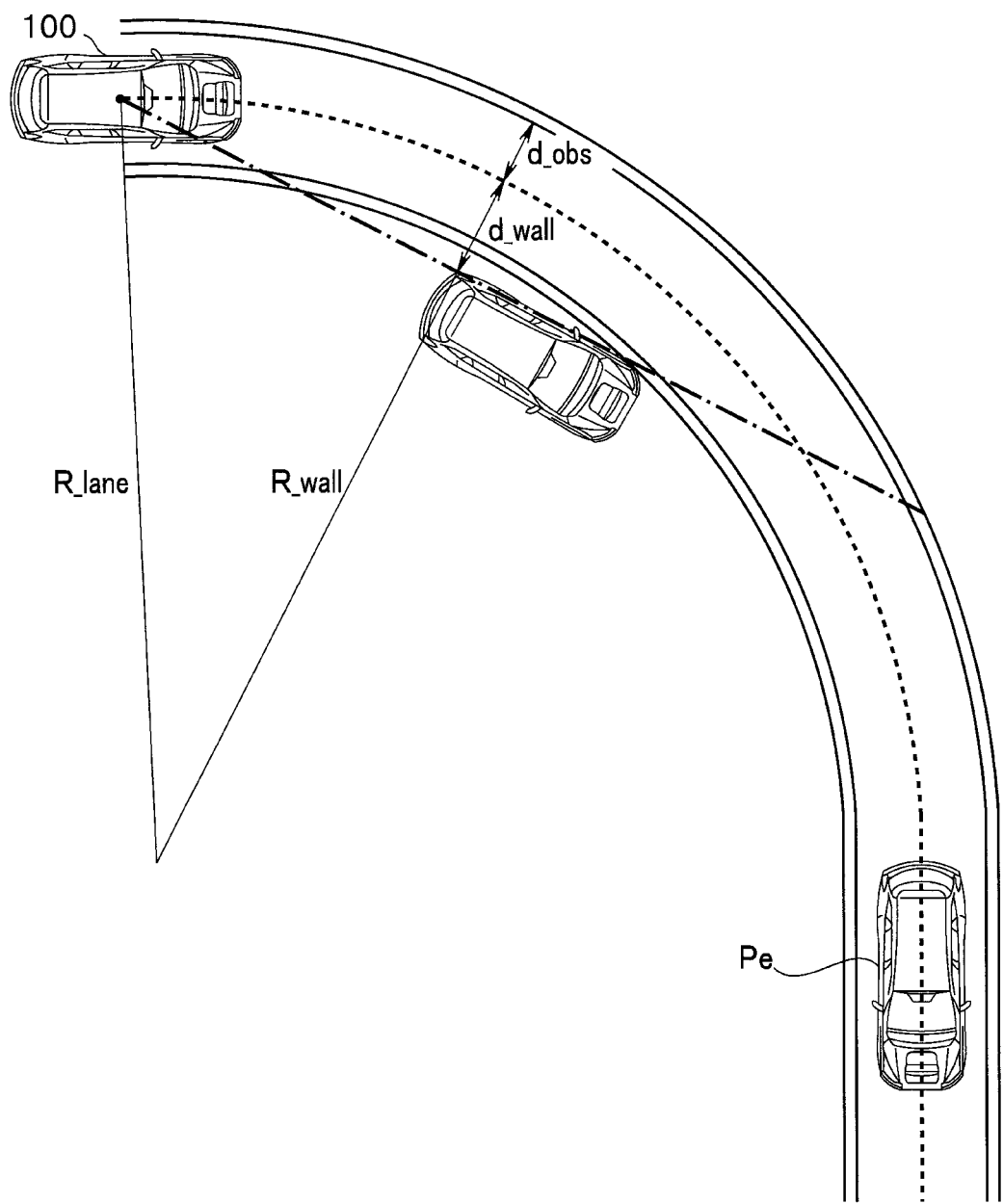
FIG. 8 is an explanatory diagram illustrating the visibility distance by the autonomous sensor when the field of view is blocked by a vehicle traveling on an adjacent lane during curve traveling.
Figure 9:
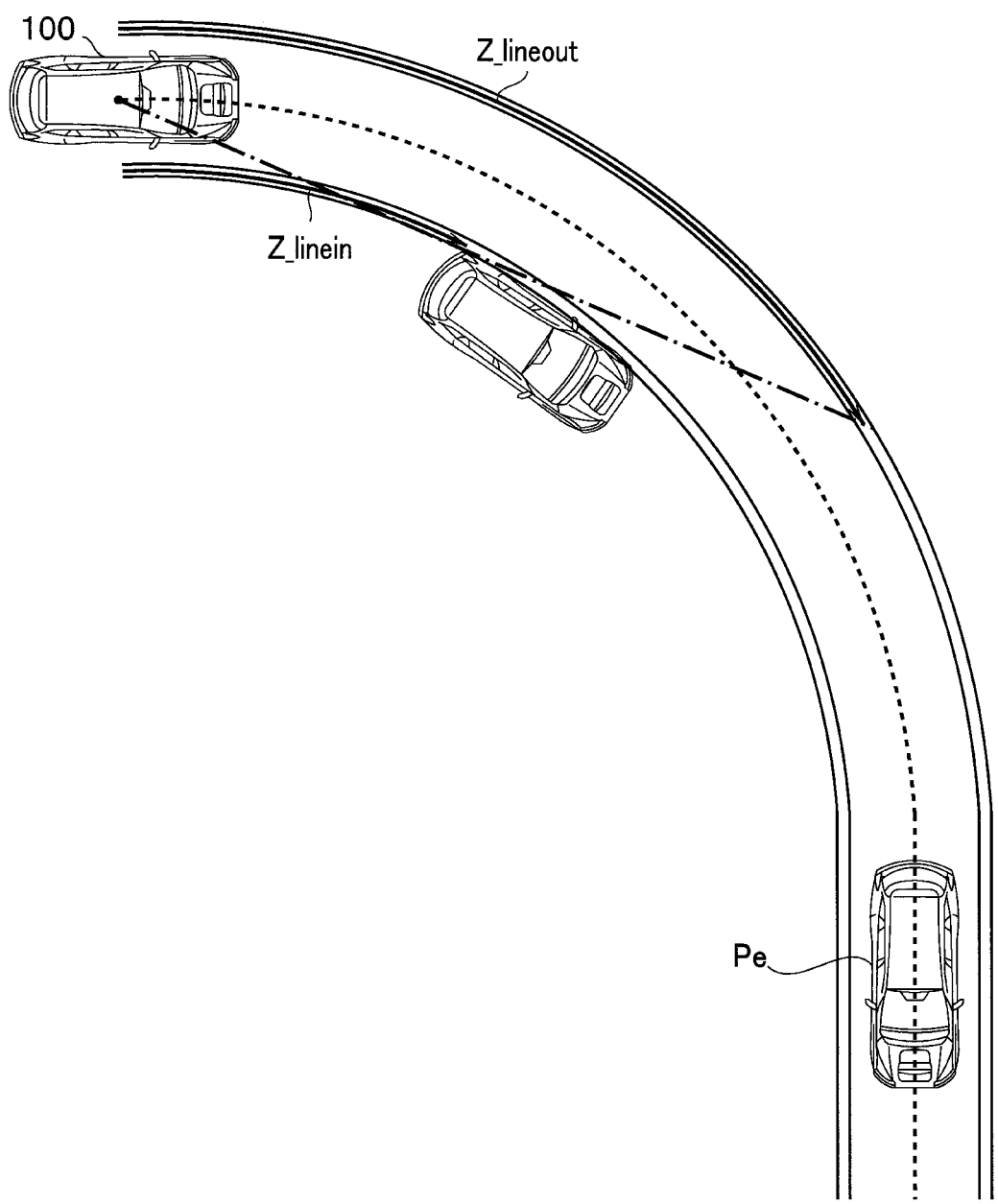
FIG. 9 is an explanatory diagram illustrating the visibility distance based on lane line recognition by the autonomous sensor when the field of view is blocked by a vehicle traveling on the adjacent lane during curve traveling.
Figure 10:
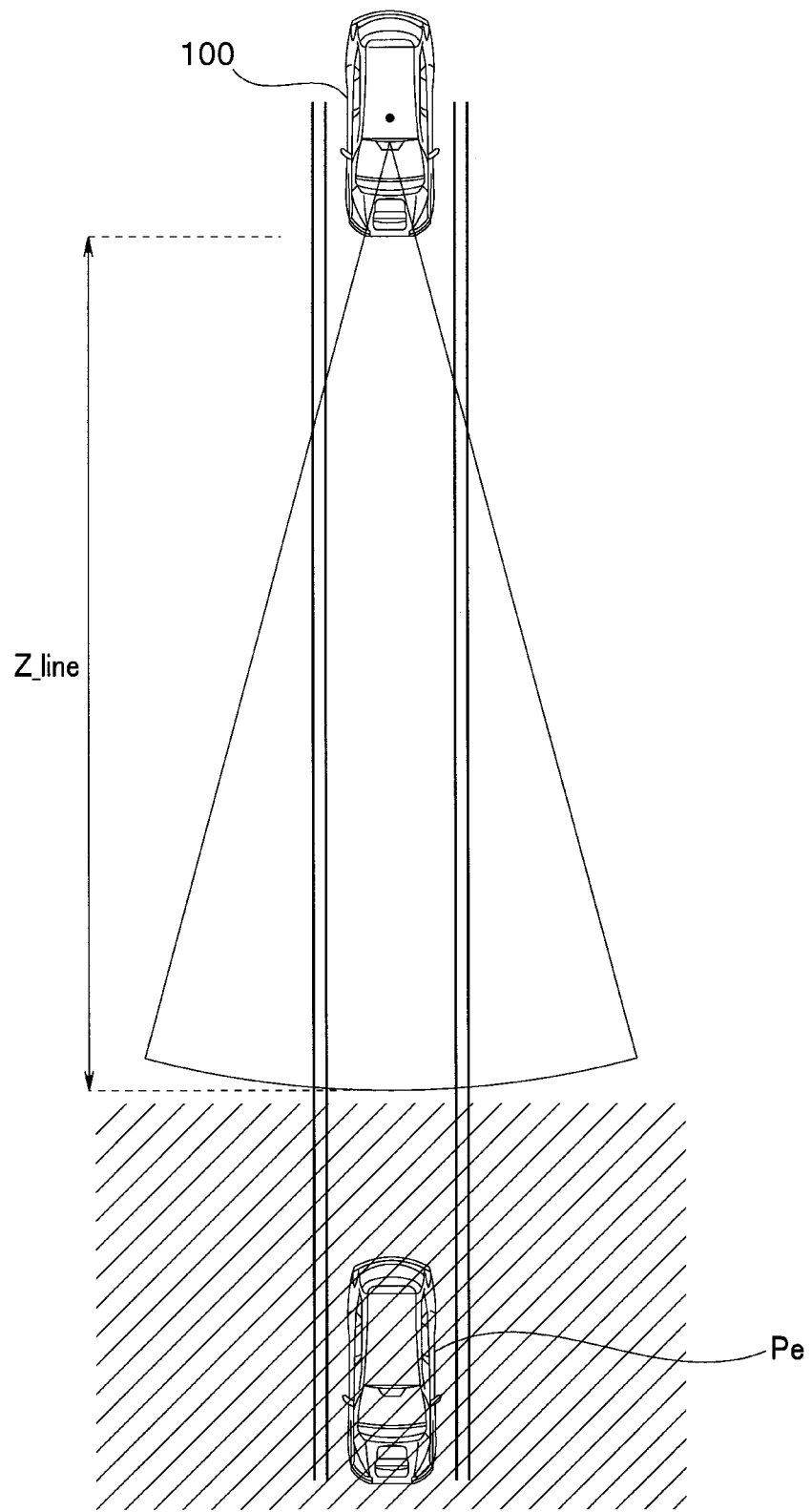
FIG. 10 is an explanatory diagram illustrating the visibility distance when the field of view is blocked by rain, fog, snowfall, a tunnel entrance or the like during straight traveling.
Figure 11:
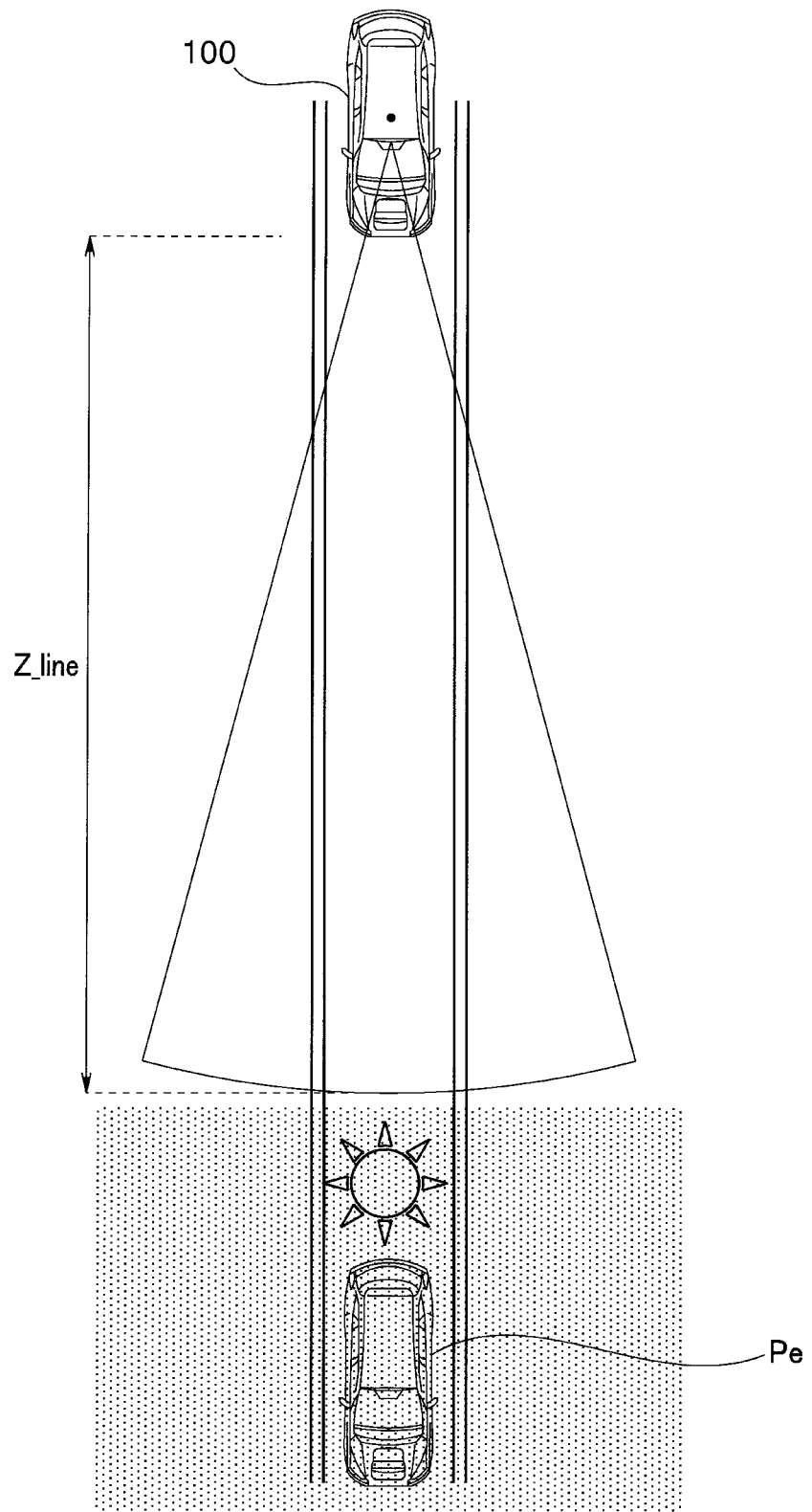
FIG. 11 is an explanatory diagram illustrating the visibility distance when the field of view is blocked by backlight during straight traveling.

On the other hand, there is a case where some traveling environment makes it impossible to detect the rearmost vehicle Pe until the own vehicle approaches the rearmost vehicle Pe. Such a case includes, for example, a case where a curve exists ahead of the own vehicle traveling path (own vehicle traveling lane), and a detection range of the camera unit 21 is partially cut off by a side wall provided along the curve as illustrated in FIGS. 3, 4, and 7, a case where a curve exists ahead of the own vehicle traveling path, and the detection range of the camera unit 21 is partially cut off by an obstacle such as a vehicle traveling on an adjacent lane on the inside of the own vehicle traveling path in a turning direction as illustrated in FIGS. 8 and 9, a case where a forward view is cut off by rain, fog, snowfall, or tunnel entrance as illustrated in FIG. 10 even when a forward path of the own vehicle traveling path is a straight path or the like, or a case where a forward view is cut off by backlight as illustrated in FIG. 11 even when the forward path of the own vehicle traveling path is a straight path or the like.

In these cases and when the rearmost vehicle Pe is detected (captured) based on only cloud information from the congestion information acquirer 22*a* earlier than by the camera unit 21, the vehicle control calculator 22*b* calculates a preliminary deceleration distance Z_predec as a second control target distance necessary to cause the own vehicle 100 to stop before the rearmost vehicle Pe by using a preset second deceleration (a preliminary deceleration a_cloud which is a preliminary deceleration smaller than the basic deceleration a_acc), and performs second deceleration control (preliminary deceleration control) using the preliminary deceleration a_cloud when an inter-vehicle distance (cloud inter-vehicle distance Z_cloud), which is a road distance to the rearmost vehicle Pe captured from the cloud information, falls below the preliminary deceleration distance Z_predec.

The preliminary deceleration based on such cloud information is presupposed to be taken over to deceleration control using the basic deceleration a_acc, and it is presupposed that the cloud inter-vehicle distance Z_cloud itself inherently has a predetermined error. Note that such an error can be predicted as a cloud estimation error Z_err to some extent from the precision of VICS or the like, and can be handled as a fixed value.

Therefore, in a case where a visibility distance Z_vis, which is a distance in which the traveling environment information can be recognized by the camera unit 21, is short and the error of the cloud inter-vehicle distance Z_cloud is large, even when the preliminary deceleration has been performed based on the cloud information, the preliminary deceleration may be insufficient. Therefore, the vehicle control calculator 22*b* calculates the visibility distance Z_vis by the camera unit 21, and when the sum of the calculated visibility distance Z_vis and a cloud estimation error Z_err is larger than the preliminary deceleration distance Z_predec, calculates a deceleration required distance Z_req which is a distance required until the preliminary deceleration is taken over to the following deceleration at the current own vehicle speed V_acc. When the sum of the visibility distance Z_vis, the cloud estimation error Z_err, and the deceleration required distance Z_req becomes larger than the cloud inter-vehicle distance Z_cloud, the preliminary deceleration control is started even when the sum has not reached the preliminary deceleration distance Z_predec.

In one embodiment, the vehicle control calculator 22*b* may serve as a "visibility distance calculator", a "first deceleration controller", a "second deceleration controller", and a "start timing changer".

Figure 2:
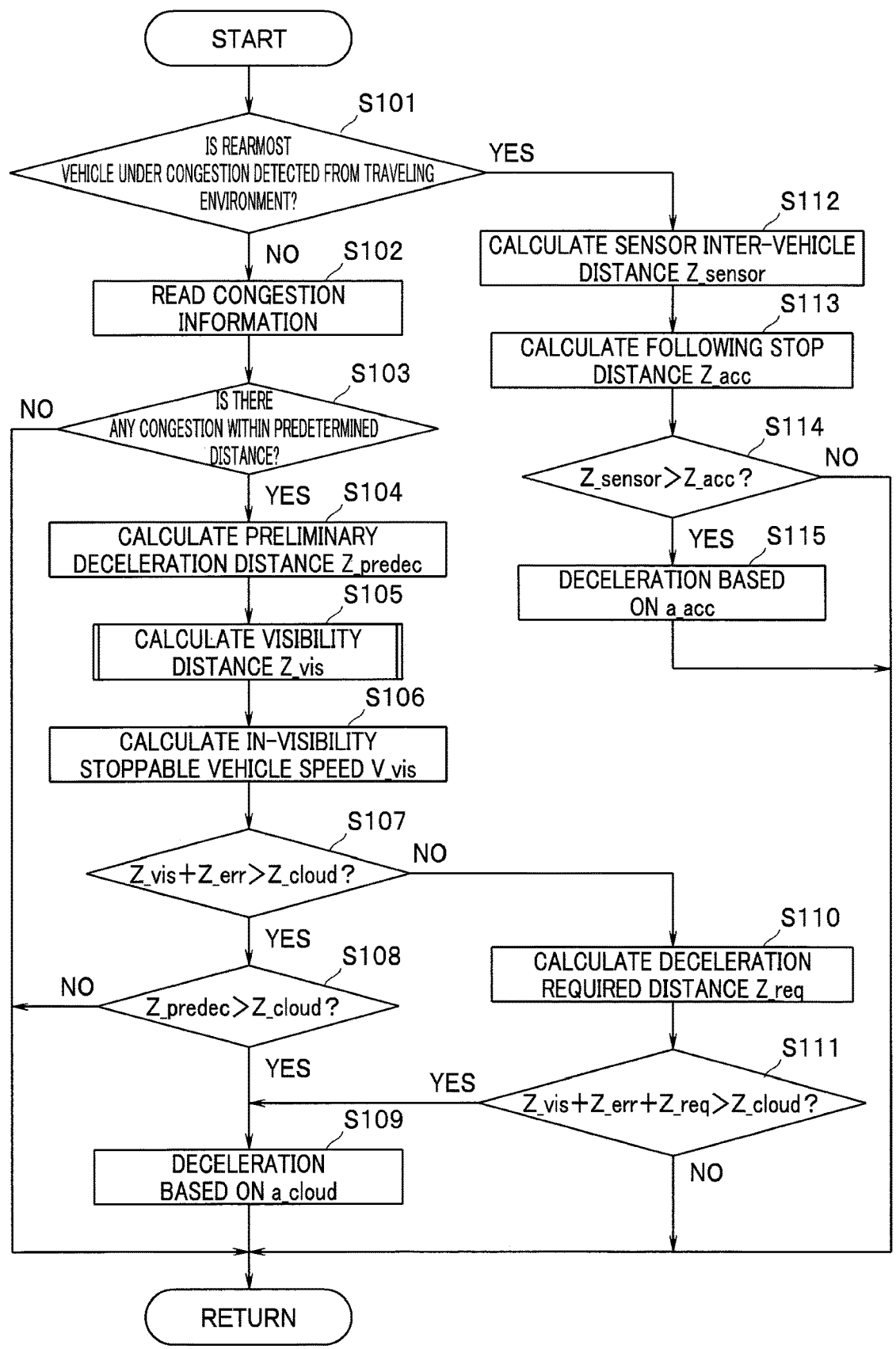
FIG. 2 is a flowchart illustrating a deceleration control routine before congestion.

Specifically, the pre-congestion deceleration control in the vehicle control calculator 22*b* described above is executed according to a flowchart of a pre-congestion deceleration control routine illustrated in FIG. 2.

The routine is repeatedly executed every set time. When the routine starts, the vehicle control calculator 22*b* first examines whether a rearmost vehicle in congestion is detected from traveling environment information recognized by the camera unit 21 in step S101.

Then, when the vehicle control calculator 22*b* determines in step S101 that no rearmost vehicle has been detected, the processing proceeds to step S102, and when the vehicle control calculator 22*b* determines in step S101 that a rearmost vehicle has been detected, the processing proceeds to step S112.

When the processing proceeds from step S101 to step S102, the vehicle control calculator 22*b* reads the congestion information from the congestion information acquirer 22*a*, and examines whether congestion exists within a predetermined distance ahead of the own vehicle 100 in subsequent step S103.

Then, when the vehicle control calculator 22*b* determines in step S103 that the congestion exists within the predetermined distance, the processing proceeds to step S104, and, when the vehicle control calculator 22*b* determines that no congestion exists within the predetermined distance, the processing exists from the routine.

When the processing proceeds from step S103 to step S104, with respect to the rearmost vehicle based on the congestion information read from the congestion information acquirer 22*a*, the vehicle control calculator 22*b* calculates a preliminary deceleration distance Z_predec which is a distance necessary to cause the own vehicle to stop before the rearmost vehicle when the own vehicle 100 performs preliminary deceleration from the current vehicle speed by using only the preset preliminary deceleration a_cloud.

The preliminary deceleration distance Z_predec is calculated, for example, based on the following equation (1).

$$Z\_predec = V\_acc^2/(2 \cdot a\_cloud) \quad (1)$$

Note that in the equation (1), V_acc represents the own vehicle speed in the adaptive cruise control.

When the processing proceeds from step S104 to step S105, the vehicle control calculator 22b calculates the visibility distance Z_vis by the in-vehicle camera from the traveling environment information recognized by the camera unit 21.

The visibility distance Z_vis is calculated by various patterns according to the traveling environment information recognized by the camera unit 21. For example, as the visibility distance Z_vis in a case where a curve exists ahead of the own vehicle traveling path and the detection range of the camera unit 21 is partially cut off by a side wall provided along the curve, it is possible to calculate, based on relationship illustrated in FIG. 7 by using the following equations (2) to (4), a visibility distance Z_vis (100%) to a point at which 100% of the own vehicle traveling path can be visually recognized, a visibility distance Z_vis (50%) to a point at which 50% of the own vehicle traveling path can be visually recognized, and a visibility distance Z_vis (0%) to a point at which the own vehicle traveling path cannot be visually recognized.

$$Z\_vis(100\%) = (R\_lane^2 - (R\_lane - d\_wall)^2)^{1/2} \quad (2)$$

$$Z\_vis(50\%) = Z\_vis(100\%) \cdot 2 \quad (3)$$

$$Z\_vis(0\%) = ((R\_lane + d\_lane)^2 - R\_wall^2)^{1/2} + Z\_vis(100\%) \quad (4)$$

Here, in the equations, R_lane represents the radius of a road, R_wall represents the radius of a wall surface, d_lane represents a half value of a road width, and d_wall represents a distance from the road center to the wall surface.

For example, as a visibility distance Z_vis in a case where a curve exists ahead of the own vehicle traveling path and the detection range of the camera unit 21 is partially cut off by an obstacle such as a vehicle traveling on an adjacent lane on the inside of the own vehicle traveling path in a turning direction, it is possible to calculate, based on the relationship illustrated in FIG. 8 by using the following equations (5) to (7), a visibility distance Z_vis (100%) to the point at which 100% of the own vehicle traveling path can be visually recognized, a visibility distance Z_vis (50%) to the point at which 50% of the own vehicle traveling path can be visually recognized, and a visibility distance Z_vis (0%) to the point at which the own vehicle traveling path cannot be visually recognized.

$$Z\_vis(100\%) = (R\_lane^2 - (R\_lane - d\_obs)^2)^{1/2} \quad (5)$$

$$Z\_vis(50\%) = Z\_vis(100\%) \cdot 2 \quad (6)$$

$$Z\_vis(0\%) = ((R\_lane + d\_lane)^2 - R\_obs^2)^{1/2} + Z\_vis(100\%) \quad (7)$$

Here, in the equations, R_obs represents a distance from the center of a curve to the obstacle (for example when the obstacle is a vehicle, a turning radius of the vehicle), and d_obs represents a distance from the center of a road to the obstacle.

Alternatively, for example, as illustrated in FIG. 9, it is possible to calculate, based on lane lines on the inside and the outside in the turning direction for defining the own vehicle traveling path by using the following equations (8) to (10), a visibility distance Z_vis (100%) to the point where 100% of the own vehicle traveling path can be visually recognized, a visibility distance Z_vis (50%) to the point where 50% of the own vehicle traveling path can be visually recognized, and a visibility distance Z_vis (0%) to the point where the own vehicle traveling path cannot be visually recognized.

$$Z\_vis(100\%) = Z\_linein \quad (8)$$

$$Z\_vis(50\%) = Z\_vis(100\%) \cdot 2 \quad (9)$$

$$Z\_vis(0\%) = Z\_lineout \quad (10)$$

Here, Z_linein represents a visible distance of the lane line on the inside in the turning direction, and Z_lineout represents a visible distance of the lane line on the outside in the turning direction.

Note that any of the visibility distances may be used as a visibility distance Z_vis for such a curve, but in the following control, for example, the visibility distance Z_vis (50%) can be preferably used.

For example, as illustrated in FIGS. 10 and 11, a distance Z_line where the lane line can be visually recognized can be used as the visibility distance Z_vis in a case where even if a forward side of the own vehicle traveling path is a straight path or the like, a forward view is cut off by rain, fog, snowfall, tunnel entrance, or the like, or in a case where even if a forward side of the own vehicle traveling path is a straight path or the like, a forward view is cut off by backlight.

When the processing proceeds from step S105 to step S106, the vehicle control calculator 22b calculates an in-visibility stoppable vehicle speed V_vis which is a maximum vehicle speed at which the own vehicle 100 can be stopped within a visibility distance when the own vehicle 100 is decelerated by using a preset basic deceleration a_acc.

The in-visibility stoppable vehicle speed V_vis is calculated based on the following equation (11), for example.

$$V\_vis = (2 \cdot a\_acc \cdot Z\_vis)^{1/2} \quad (11)$$

When the processing proceeds from step S106 to step S107, the vehicle control calculator 22b examines whether the sum of the visibility distance Z_vis and the cloud estimation error Z_err is larger than the cloud inter-vehicle distance Z_cloud from the own vehicle 100 to the rearmost vehicle Pe under the congestion obtained by the congestion information acquirer 22a.

When the vehicle control calculator 22b determines in step S107 that the sum of the visibility distance Z_vis and the cloud estimation error Z_err is larger than the cloud inter-vehicle distance Z_cloud, the processing proceeds to step S108, and when the vehicle control calculator 22b determines in step S107 that the sum of the visibility distance Z_vis and the cloud estimation error Z_err is not more than the cloud inter-vehicle distance Z_cloud, the processing proceeds to step S110.

Note that the case where the sum of the visibility distance Z_vis and the cloud estimation error Z_err is larger than the cloud inter-vehicle distance Z_cloud is a case where there is a possibility that the rearmost vehicle Pe under the congestion which is currently acquired by the congestion information acquirer 22a is suddenly detected by the camera unit 21 at the next moment. On the other hand, the case where the sum of the visibility distance Z_vis and the cloud estimation error Z_err is not more than the cloud inter-vehicle distance Z_cloud is a case where there is a low possibility that the rearmost vehicle Pe under the congestion which is currently acquired by the congestion information acquirer 22a is suddenly detected by the camera unit 21 at the next moment.

When the processing proceeds from step S107 to step S108, the vehicle control calculator 22b examines whether the preliminary deceleration distance Z_predec is larger than the cloud inter-vehicle distance Z_cloud.

When the vehicle control calculator 22b determines in step S108 that the preliminary deceleration distance Z_predec is larger than the cloud inter-vehicle distance Z_cloud, the processing proceeds to step S109, and when the vehicle control calculator 22b determines in step S108 that the preliminary deceleration distance Z_predec is not more than the cloud inter-vehicle distance Z_cloud, the processing exits from the routine.

When the processing proceeds from step S107 to step S110, in a case where the rearmost vehicle Pe under the congestion is assumed to exist at a position acquired by the congestion information acquirer 22a, the vehicle control calculator 22b calculates a deceleration required distance Z_req which is a distance necessary for deceleration using the preliminary deceleration a_cloud before taking over to the deceleration based on the basic deceleration a_acc when the own vehicle is decelerated with respect to the rearmost vehicle Pe under the congestion. In other words, in step S110, the vehicle control calculator 22b calculates the deceleration required distance Z_req as a distance necessary to decelerate the own vehicle speed V_acc to the in-visibility stoppable vehicle speed V_vis by the deceleration using the preliminary deceleration a_cloud.

This deceleration required distance Z_req is calculated based on the following equation (12), for example.

$$Z\_req = (V\_acc - (2 \cdot a\_acc)^{1/2})^2)/(2 \cdot a\_cloud) \quad (12)$$

When the processing proceeds from step S110 to step S111, the vehicle control calculator 22b examines whether the sum of the visibility distance Z_vis, the cloud estimation error Z_err and the deceleration required distance Z_req is larger than the cloud inter-vehicle distance Z_cloud. Here, the sum of the visibility distance Z_vis, the cloud estimation error Z_err, and the deceleration required distance Z_req is a minimum distance necessary for causing the own vehicle 100 to stop before the rearmost vehicle Pe under the congestion without using a deceleration larger than the basic deceleration a_acc even when the actual rearmost vehicle Pe under the congestion is detected by the camera unit 21 and normal following deceleration is started after the preliminary deceleration based on the preliminary deceleration a_cloud with respect to the rearmost vehicle Pe under the congestion is started.

When the vehicle control calculator 22b determines in step S111 that the sum of the visibility distance Z_vis, the cloud estimation error Z_err, and the deceleration required distance Z_req is larger than the cloud inter-vehicle distance Z_cloud, the processing proceeds to step S109, and when the vehicle control calculator 22b determines in step S111 that the sum of the visibility distance Z_vis, the cloud estimation error Z_err and the deceleration required distance Z_req is not more than the cloud inter-vehicle distance Z_cloud, the processing exits from the routine.

When the processing proceeds from step S108 or step S111 to step S109, the vehicle control calculator 22b performs deceleration based on the preliminary deceleration a_cloud, and then, the processing exits from the routine.

When the processing proceeds from step S101 to step S112, the vehicle control calculator 22b calculates a sensor inter-vehicle distance Z_sensor which is an inter-vehicle distance to the actual rearmost vehicle Pe detected by the camera unit 21.

In subsequent step S113, the vehicle control calculator 22b calculates a following stop distance Z_acc as a distance necessary to cause the own vehicle 100 traveling at the own vehicle speed V_acc to stop before the rearmost vehicle Pe under the congestion by deceleration using the basic deceleration a_acc.

The following stop distance Z_acc is calculated based on the following equation (13), for example.

$$Z\_acc = (V\_acc^2)/(2 \cdot a\_acc) \quad (13)$$

In subsequent step S114, the vehicle control calculator 22b examines whether the sensor inter-vehicle distance Z_sensor is larger than the following stop distance Z_acc.

When the vehicle control calculator 22b determines in step S114 that the sensor inter-vehicle distance Z_sensor is not more than the following stop distance Z_acc, the processing exits from the routine.

On the other hand, when the vehicle control calculator 22b determines in step S114 that the sensor inter-vehicle distance Z_sensor is larger than the following stop distance Z_acc, the processing proceeds to step S115 and the vehicle control calculator 22b performs the deceleration based on the basic deceleration a_acc. After that, the processing exits from the routine.

According to such an embodiment, in the configuration that the vehicle control calculator 22b calculates the visibility distance Z_vis by the stereo camera based on the traveling environment recognized by the camera unit 21, calculates the following stop distance Z_acc for decelerate the own vehicle speed V_acc by using the basic deceleration a_acc to cause the own vehicle to stop before the rearmost vehicle Pe under the congestion when the rearmost vehicle Pe under the congestion is recognized ahead of the own vehicle traveling path, performs the deceleration control based on the following stop distance Z_acc, calculates the preliminary deceleration distance Z_predec for decelerating the own vehicle speed V_acc by using the preliminary deceleration a_cloud smaller than the basic deceleration a_acc to cause the own vehicle to stop before the rearmost vehicle Pe under the congestion when the rearmost vehicle Pe under the congestion is recognized only by the congestion information acquirer 22a, and performs the deceleration control based on the preliminary deceleration distance Z_predec until the deceleration is taken over to the deceleration based on the basic deceleration a_acc, when the sum of the cloud estimation error Z_err set in the congestion information acquirer 22a and the visibility distance Z_vis is larger than the cloud inter-vehicle distance Z_cloud which is the distance to the rearmost vehicle Pe under the congestion recognized by the congestion information acquirer 22a, the vehicle control calculator 22b calculates the deceleration required distance Z_req necessary until the deceleration control is taken over from the deceleration control based on the preliminary deceleration a_cloud to the deceleration control based on the basic deceleration a_acc, and performs the deceleration control based on the preliminary deceleration a_cloud from a distance longer than the preliminary deceleration distance Z_predec at a timing based on the deceleration required distance Z_req, whereby it is possible to perform deceleration control with respect to the preceding vehicle without performing rapid deceleration even on a road with poor visibility, etc.

Figure 6A:
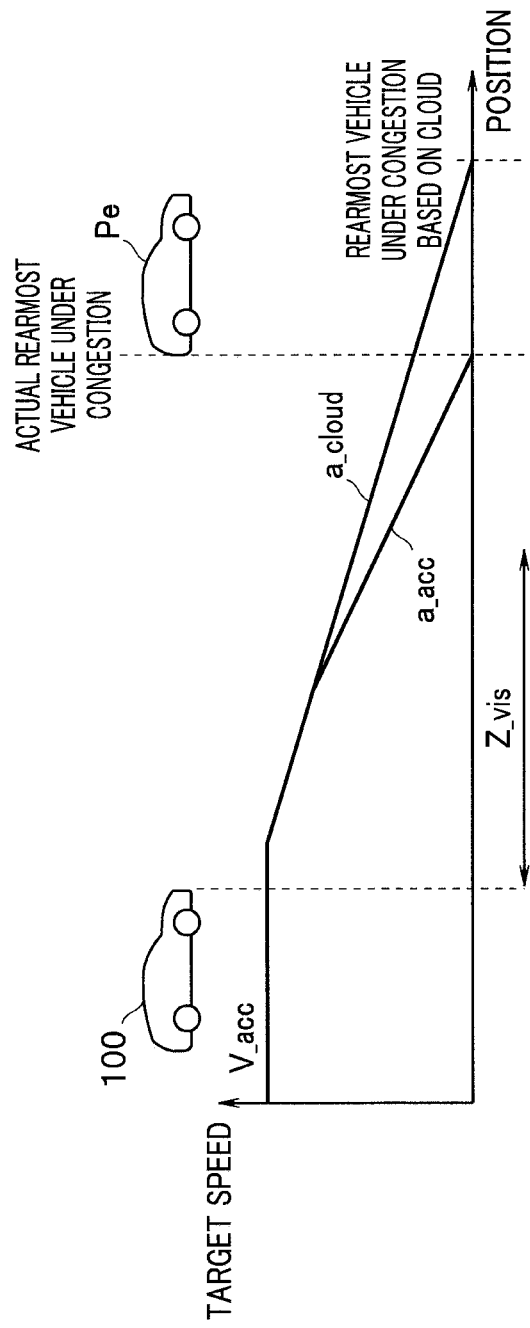
FIG. 6A is an explanatory diagram illustrating deceleration control when a detection range by the autonomous sensor is sufficient.

In other words, in the case where the rearmost vehicle Pe under the congestion is recognized only by the congestion information acquirer 22a as illustrated in FIG. 6A, for example, when the sum of the cloud estimation error Z_err and the visibility distance Z_vis is not more than the cloud inter-vehicle distance Z_cloud, the visibility distance Z_vis is a sufficient distance, and by starting the deceleration control using the preliminary deceleration a_cloud at a timing based on the preliminary deceleration distance Z_predec, it is possible to perform takeover to the deceleration control using the basic deceleration a_acc at a proper vehicle speed without starting the deceleration control at an unnecessarily early timing when the rearmost vehicle Pe under the congestion is detected by the camera unit 21.

On the other hand, as illustrated in FIG. 6B, for example, when the sum of the cloud estimation error Z_err and the visibility distance Z_vis is larger than the cloud inter-vehicle distance Z_cloud, by considering the possibility that the visibility distance Z_vis is an insufficient distance, and by starting the deceleration control using the preliminary deceleration a_cloud at a timing considering the deceleration required distance Z_req (that is, a timing of visibility distance correction), it is possible to prevent the deceleration based on the preliminary deceleration a_cloud from becoming insufficient due to a recognition error by the congestion information acquirer 22a even when the rearmost vehicle Pe under the congestion is detected at a relatively short distance by the camera unit 21. Even in this case, it is also possible to perform takeover to the deceleration control using the basic deceleration a_acc at an appropriate vehicle speed.

Note that the technology is not limited to the embodiments described above, but may be subjected to various modifications and alterations, and the technology subjected to various modifications and alterations are also within the technical scope of the technology. For example, in the above-described embodiment, an example in which a stereo camera is used as an autonomous sensor has been described. However, it goes without saying that other sensors such as a laser radar may be used as the autonomous sensor.

According to the vehicle traveling control apparatus of the technology, it is possible to perform deceleration control with respect to a preceding vehicle without rapid deceleration even on a road with poor visibility.

The locator unit 11, the camera unit 21 and the automatic driving control unit 22 provided in the automatic driving system 1 illustrated in FIG. 1 can be implemented, in place of the above-described microcomputer, by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the locator unit 11, the camera unit 21 and the automatic driving control unit 22 provided in the automatic driving system 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
   a first traveling environment recognition unit configured to recognize, with an autonomous sensor mounted in an own vehicle, a traveling environment ahead of an own vehicle traveling path in which the own vehicle travels;
   a second traveling environment recognition unit configured to recognize a traveling environment ahead of the own vehicle traveling path based on information received from an outside of the own vehicle by external communication;
   a visibility distance calculating unit configured to calculate a visibility distance by the autonomous sensor based on the traveling environment recognized by the first traveling environment recognition unit;
   a first deceleration control unit configured to, when a rearmost vehicle under congestion is recognized by the first traveling environment recognition unit, calculate a first control target distance for causing the own vehicle to stop before the rearmost vehicle under congestion at a first deceleration, and perform first deceleration control based on the first control target distance;
   a second deceleration control unit configured to, when the rearmost vehicle under the congestion is recognized only by the second traveling environment recognition unit, calculate a second control target distance for causing the own vehicle to stop before the rearmost vehicle under the congestion at a second deceleration that is a deceleration smaller than the first deceleration, and perform second deceleration control based on the second control target distance; and
   a start timing changing unit configured to, when a sum of an estimation error of a distance set in the second traveling environment recognition unit and the visibility distance is larger than a distance to the rearmost vehicle under the congestion recognized by the second traveling environment recognition unit, calculate a deceleration required distance necessary until deceleration control is taken over from the second deceleration control to the first deceleration control, and start the second deceleration control from a distance longer than the second control target distance at a timing considering the deceleration required distance.

2. The vehicle traveling control apparatus according to claim 1, wherein the start timing changing unit starts the second deceleration control when a sum of the visibility distance, the estimation error, and the deceleration required distance is larger than the distance to the rearmost vehicle under the congestion recognized by the second traveling environment recognition unit.

3. A vehicle traveling control apparatus comprising circuitry configured to
   recognize, with an autonomous sensor mounted in an own vehicle, a first traveling environment ahead of an own vehicle traveling path in which the own vehicle travels, recognize a second traveling environment ahead of the own vehicle traveling path based on information received from an outside of the own vehicle by external communication, calculate a visibility distance by the autonomous sensor based on the first traveling environment, when a rearmost vehicle under congestion is recognized in the first traveling environment, calculate a first control target distance for causing the own vehicle to stop before the rearmost vehicle under the congestion at a first deceleration, and perform first deceleration control based on the first control target distance, when the rearmost vehicle under the congestion is recognized only in the second traveling environment, calculate a second control target distance for causing the own vehicle to stop before the rearmost vehicle under the congestion at a second deceleration that is a deceleration smaller than the first deceleration, and perform second deceleration control based on the second control target distance, and when a sum of an estimation error of a distance preset for the second traveling environment and the visibility distance is larger than a distance to the rearmost vehicle under the congestion recognized in the second traveling environment, calculate a deceleration required distance necessary until deceleration control is taken over from the second deceleration control to the first deceleration control, and start the second deceleration control from a distance longer than the second control target distance at a timing considering the deceleration required distance.

* * * * *